March 17, 1964 A. H. LAIDIG 3,125,228
ARTICLE-TRANSFER APPARATUS
Original Filed Oct. 9, 1959 9 Sheets-Sheet 1

INVENTOR.
ALFRED H. LAIDIG
BY
ATTORNEY.

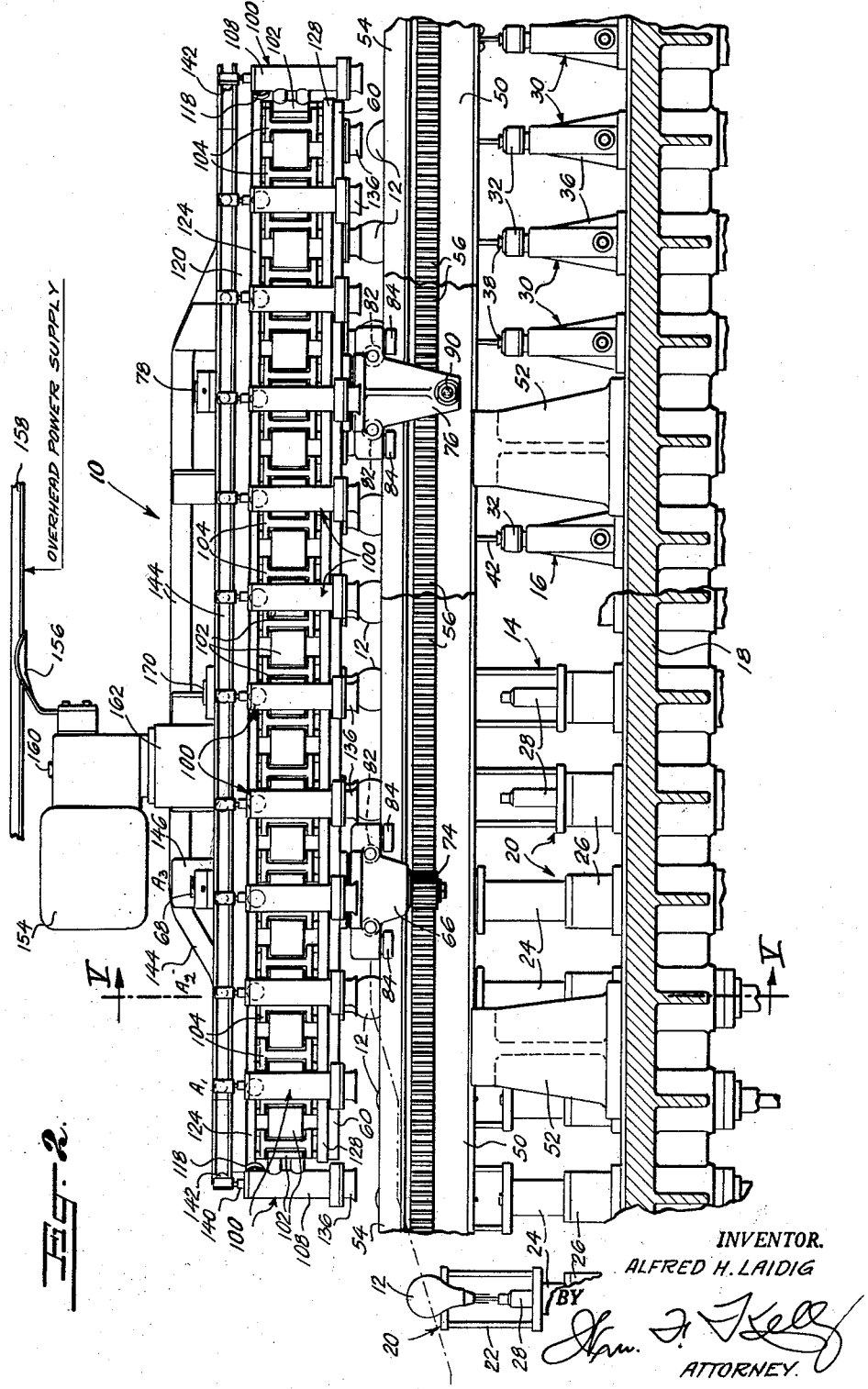

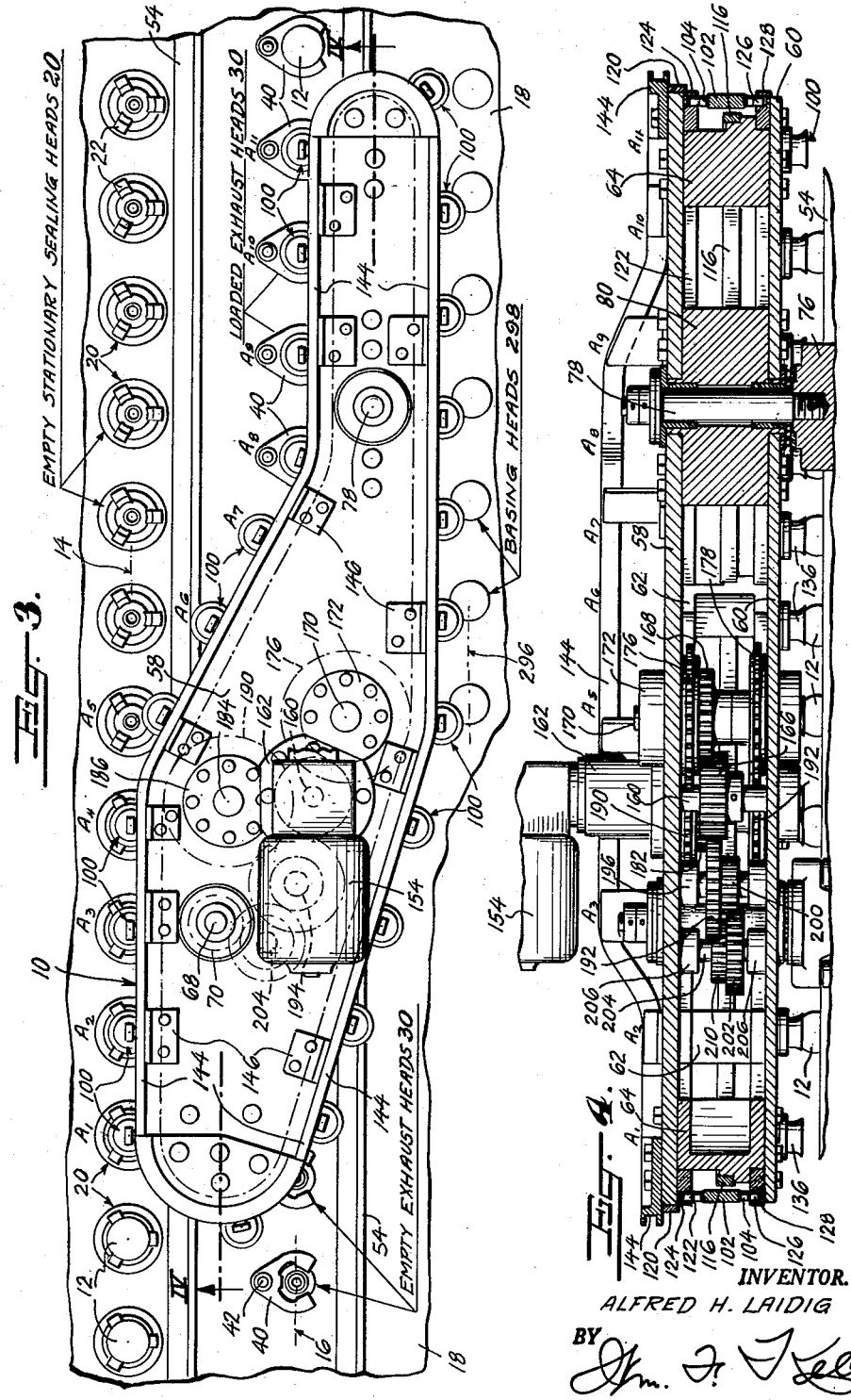

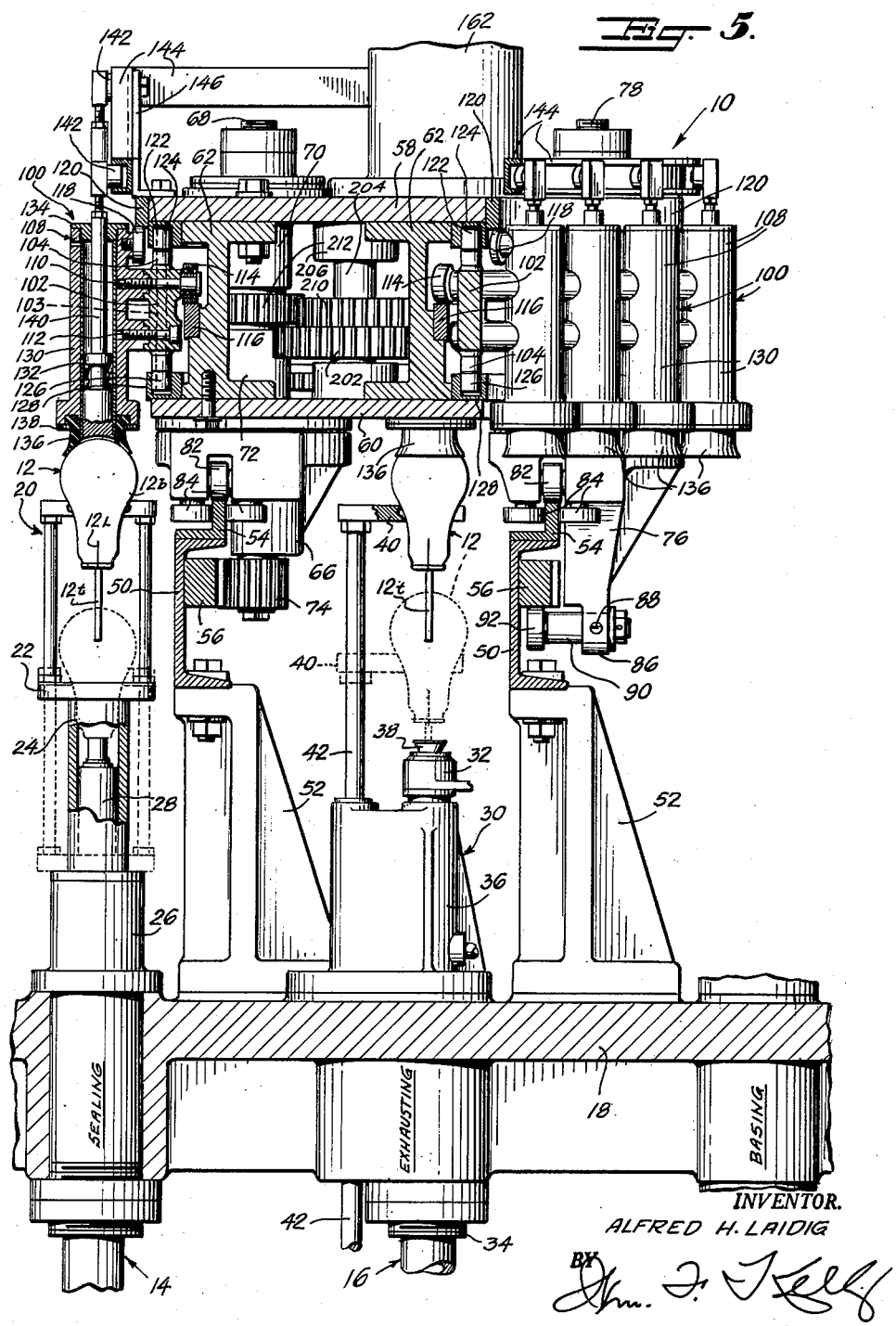

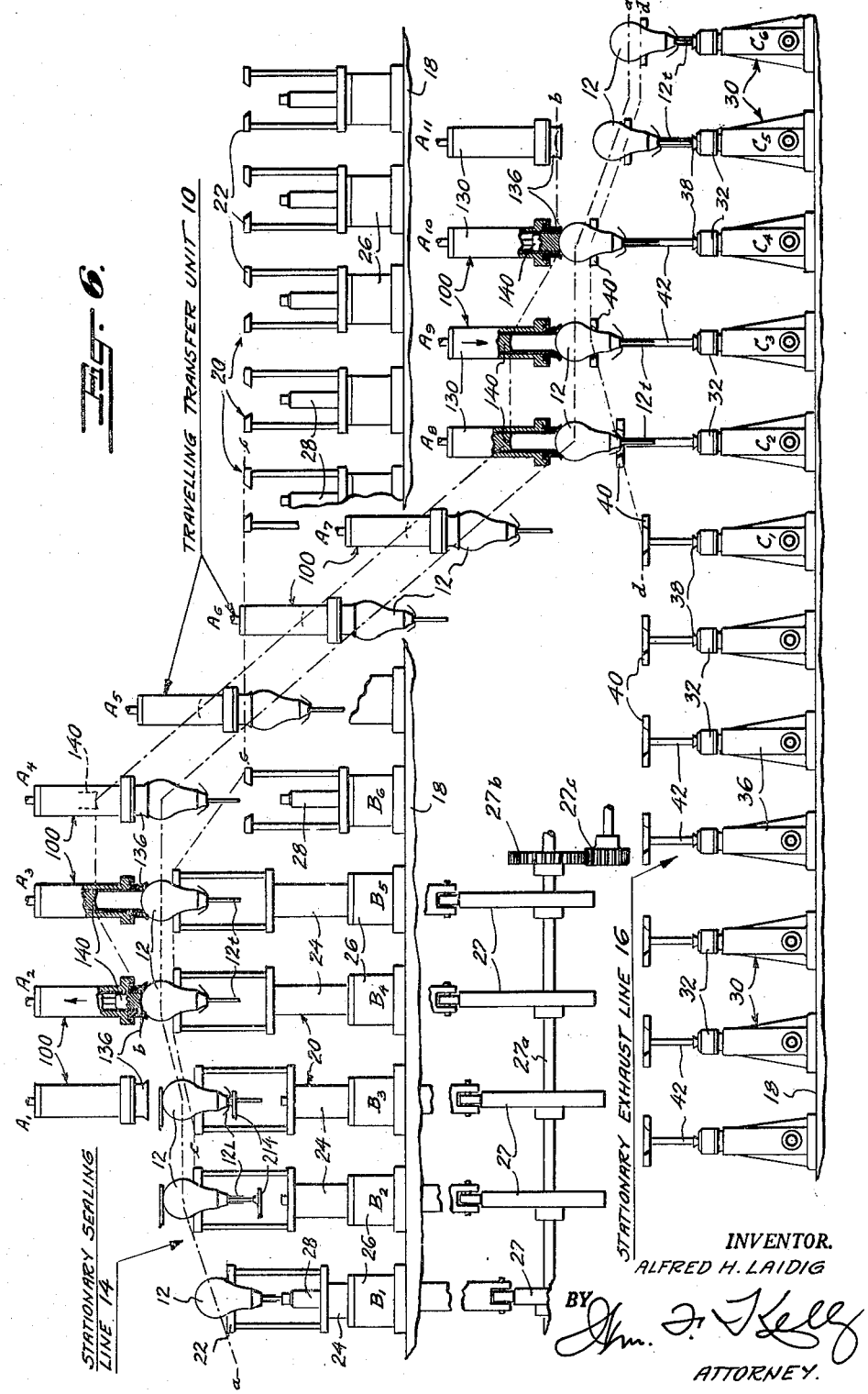

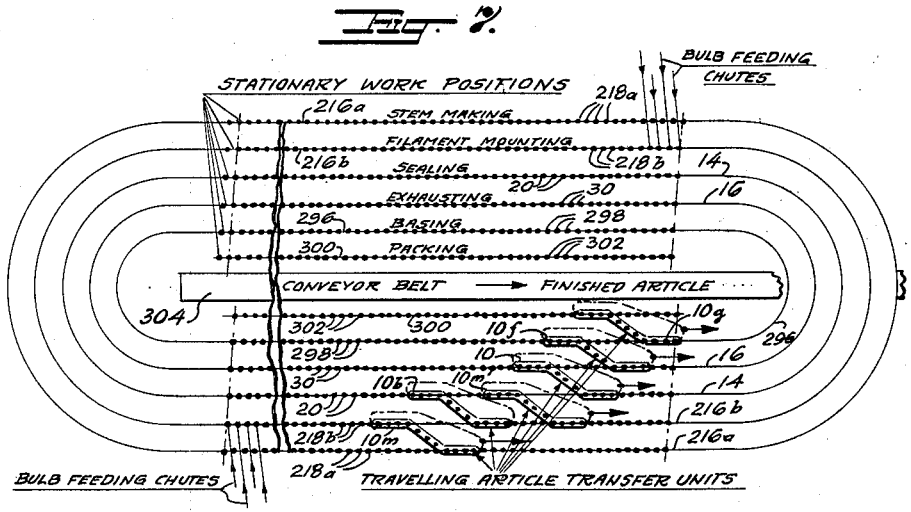
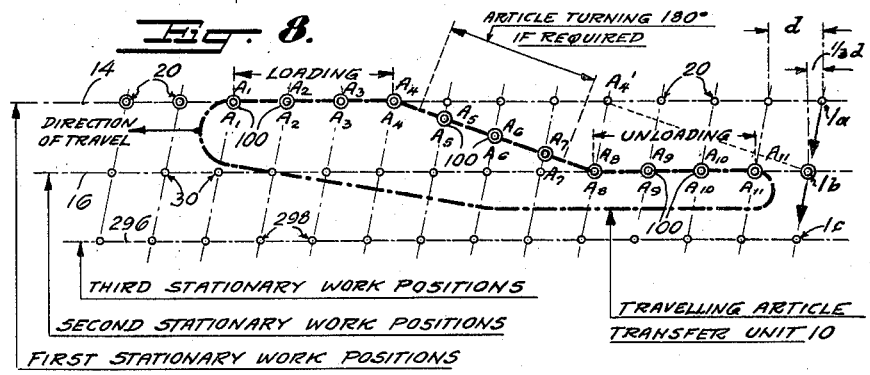
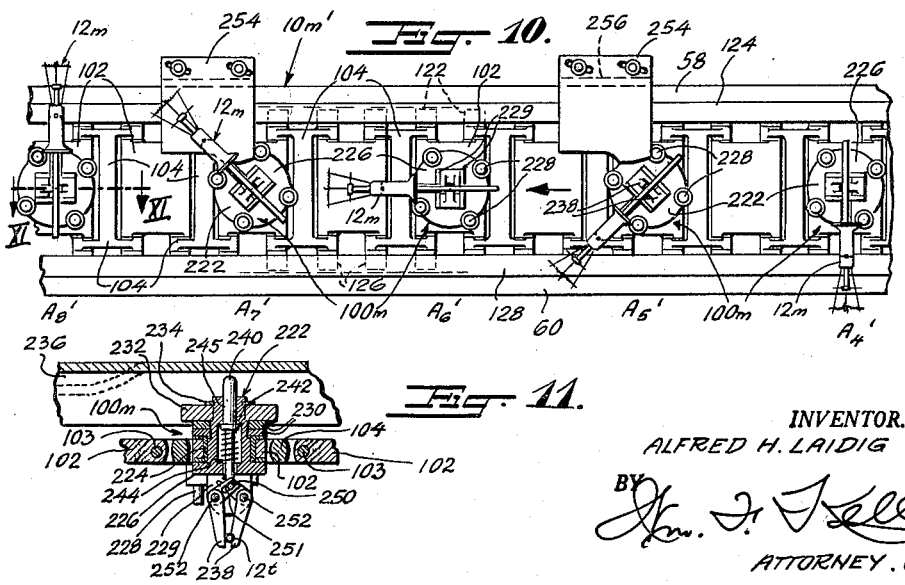

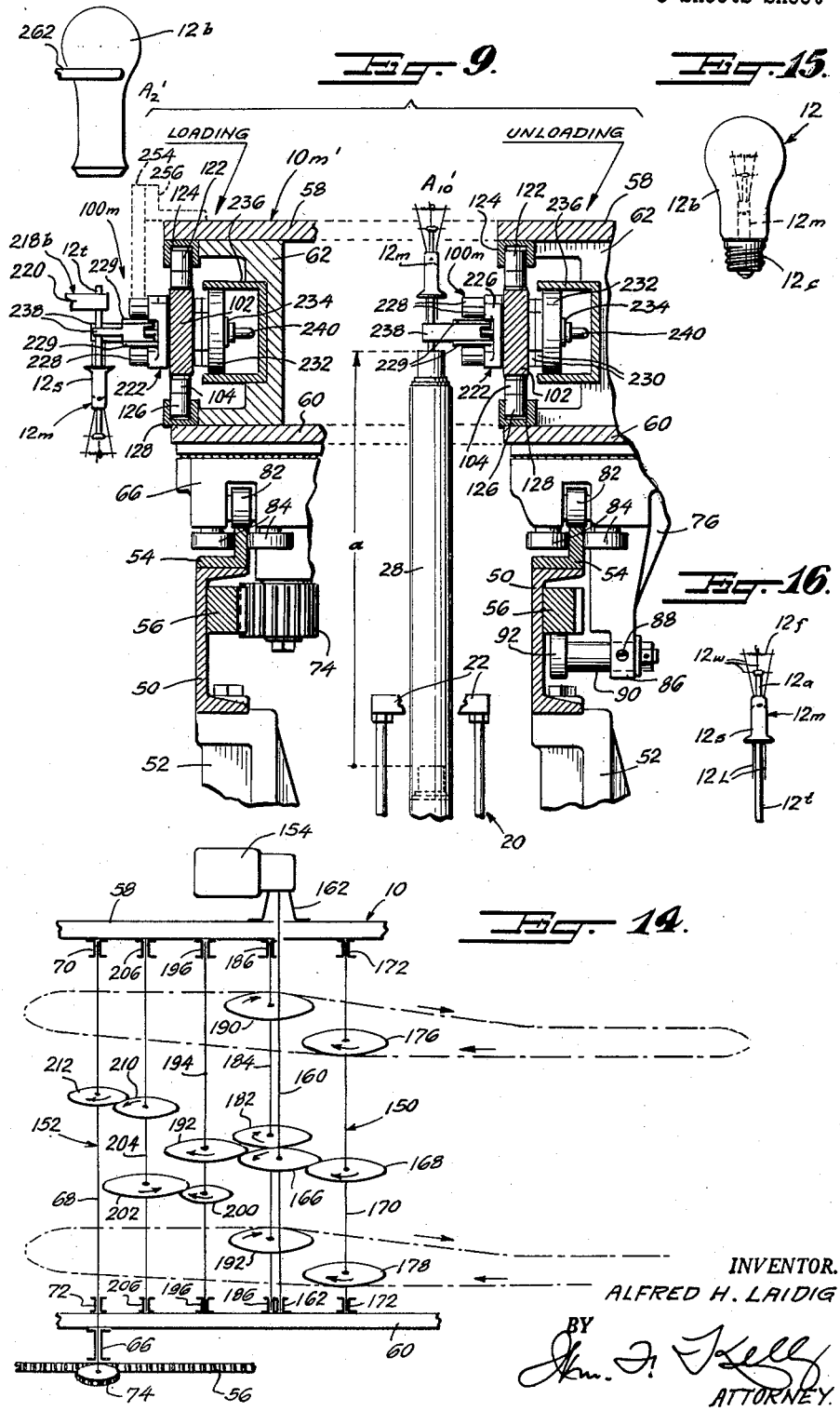

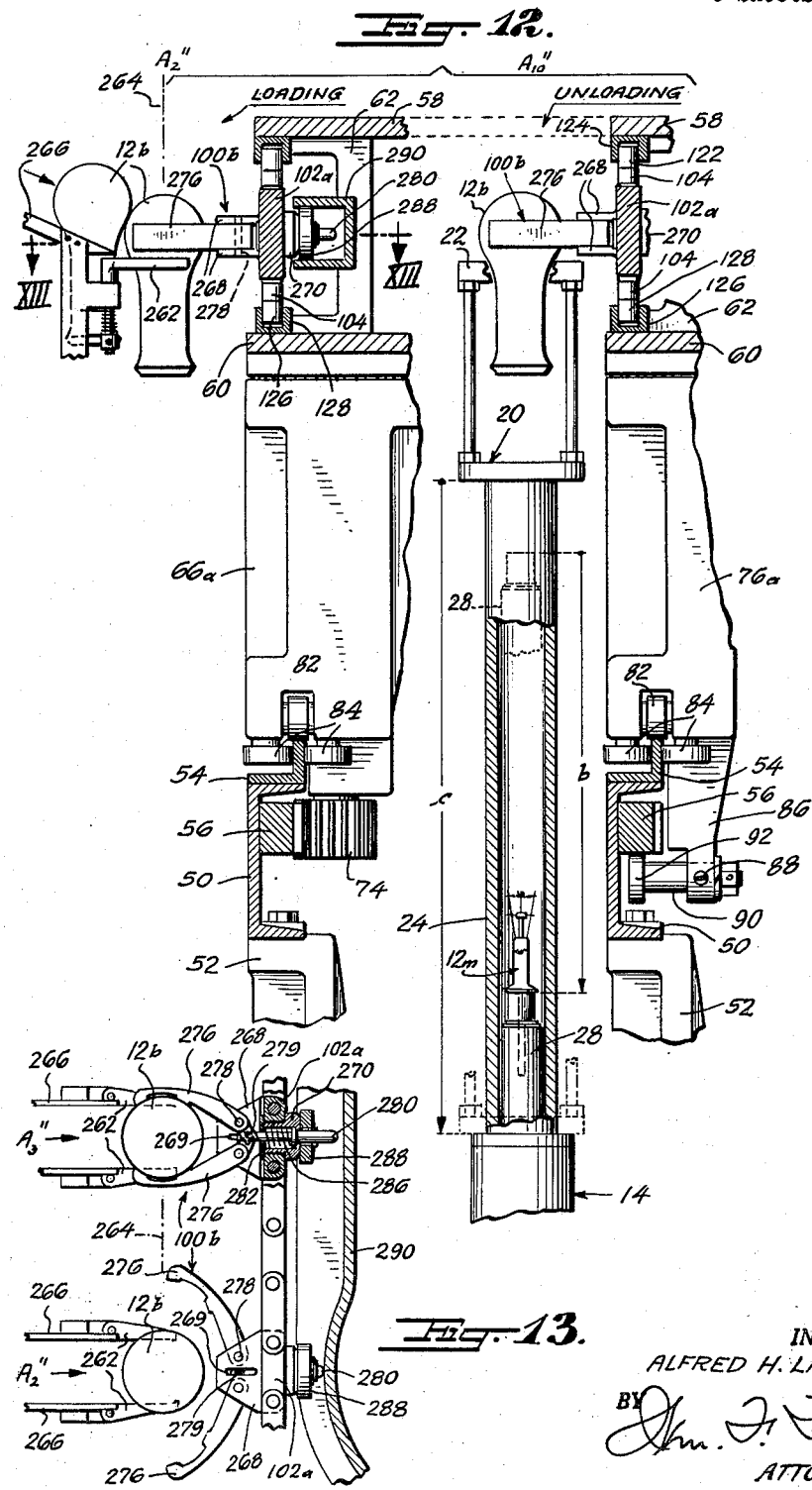

March 17, 1964 A. H. LAIDIG 3,125,228
ARTICLE-TRANSFER APPARATUS
Original Filed Oct. 9, 1959 9 Sheets-Sheet 9
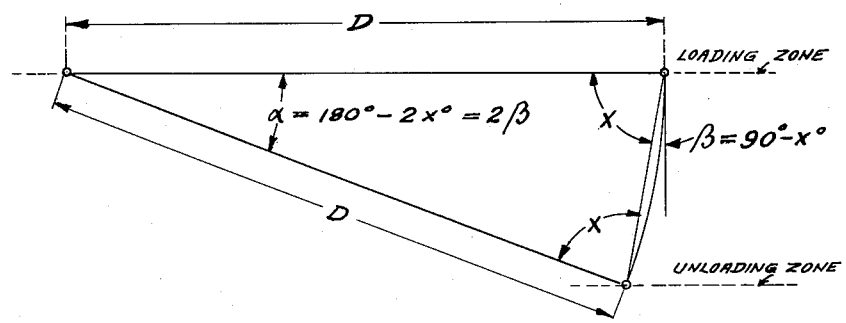
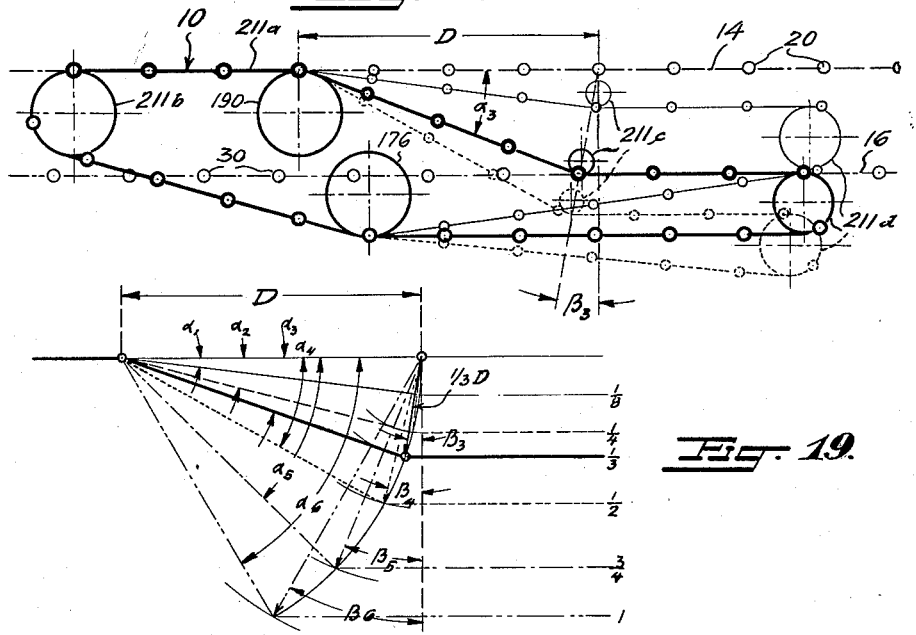
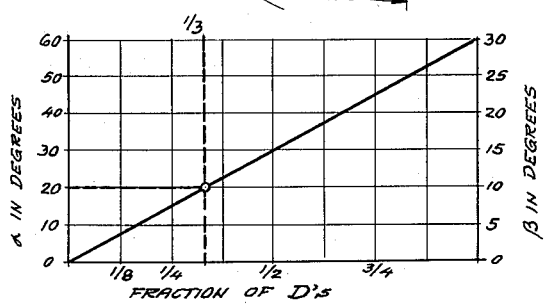
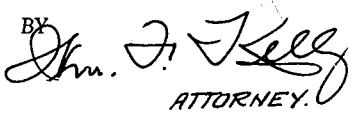
INVENTOR.
ALFRED H. LAIDIG
BY
ATTORNEY.

United States Patent Office 3,125,228
Patented Mar. 17, 1964

3,125,228
ARTICLE-TRANSFER APPARATUS
Alfred H. Laidig, Bloomfield, N.J., assignor to Westinghouse Electric Corporation, East Pittsburgh, Pa., a corporation of Pennsylvania
Continuation of application Ser. No. 845,523, Oct. 9, 1959. This application Nov. 28, 1960, Ser. No. 72,081
11 Claims. (Cl. 214—1)

The present invention relates to an automatic high speed machine for the manufacture of a product produced by the assembly of the individual parts and, more particularly, to an article transfer unit for such a machine. This application is a continuation of U.S. application Serial No. 845,523, filed Oct. 9, 1959, by A. H. Laidig, and now abandoned.

The article transfer unit of the present invention constitutes an improvement over the article-transfer unit shown in copending application, Serial No. 787,059, filed January 15, 1959, by C. M. Rively et al. This prior machine comprises a plurality of substantially parallel stationary lines of work stations and an article transfer unit adapted to move between said lines to effect the transfer of the articles from one line to the next. This prior transfer unit comprises a movable carriage, a pick-up conveyor carried by said carriage and movable with respect thereto and operable by the movement of the carriage to pick up the articles from the heads of one line of work stations, and a discharge conveyor carried by said carriage and movable with respect thereto and operable by the movement of the carriage to pick up the articles from the pick-up conveyor on said carriage and transfer the articles to the stationary heads of the next line of work stations.

The side of the pick-up conveyor adjacent the first stationary line of work stations is relatively stationary to said work stations to permit the transfer of the articles therebetween. The other side of the pick-up conveyor is of course relatively stationary with respect to one side of the discharge conveyor to permit the transfer of the articles from one conveyor to the other. Again, the other side of the discharge conveyor is relatively stationary to the second line of work stations to permit the transfer of the articles from the discharge conveyor to the second line of work stations. While it is not an undesirable feature of the prior transfer unit the articles being transferred accelerate during transfer from zero speed to double the transfer unit speed and back to zero speed again. Further, the discharge point on the second line of work stations is often several, for example ten, heads away from the pick-up point on the first line of stationary work stations, thus adding to the length of the automatic high speed manufacturing machine.

The article transfer apparatus of the present invention employs a movable carriage having a single conveyor carried thereby and movable with respect thereto and operable by the movement of the carriage to pick up articles from the first line of work stations, to move the articles substantially transverse to the path of movement of the carriage and at a fraction of the speed of said carriage and to transfer said articles to said second line of work stations.

It is accordingly the general object of this invention to provide an article transfer unit adapted to transfer articles directly across the parallel lines of work stations of an automatic high speed manufacturing machine, thus providing a shorter machine.

A further object of the present invention is the provision of an article transfer unit adapted to transfer articles between stationary lines of article work stations at a fraction of the speed of said transfer unit.

Another object of the present invention is the provision of an article transfer unit for an automatic high speed machine which minimizes the acceleration of the moving articles during transfer.

An additional object of the present invention is the provision of an article transfer unit for an automatic high speed machine adapted to operate at an article transfer speed which is any desired fraction of the speed of the transfer unit.

A still further object of the present invention is the provision of an article transfer unit adapted to rotate the transferred article as desired during transfer.

For a better understanding of the invention reference should be had to the accompanying drawings wherein FIG. 1 is a perspective view of the article transfer unit and its elevated tracks and portions of a stationary lamp sealing line and a stationary lamp exhaust line.

FIG. 2 is a side elevational view, taken from the right side of FIG. 1, of the article transfer unit and its elevated tracks and showing portions of the stationary lamp sealing line and stationary lamp exhaust line.

FIG. 3 is a plan view of the transfer unit and its tracks and portions of the sealing and exhaust lines shown in FIG. 1 and a portion of the adjacent stationary basing line.

FIG. 4 is a vertical sectional view of the transfer unit along the line IV—IV of FIG. 3 in the direction of the arrows and showing the drive mechanism for the transfer unit.

FIG. 5 is a vertical sectional view of the transfer unit and its tracks and portions of the sealing, exhaust and basing lines along the line V—V of FIG. 2 in the direction of the arrows and showing a lamp transfer head in vertical section.

Figure 1:
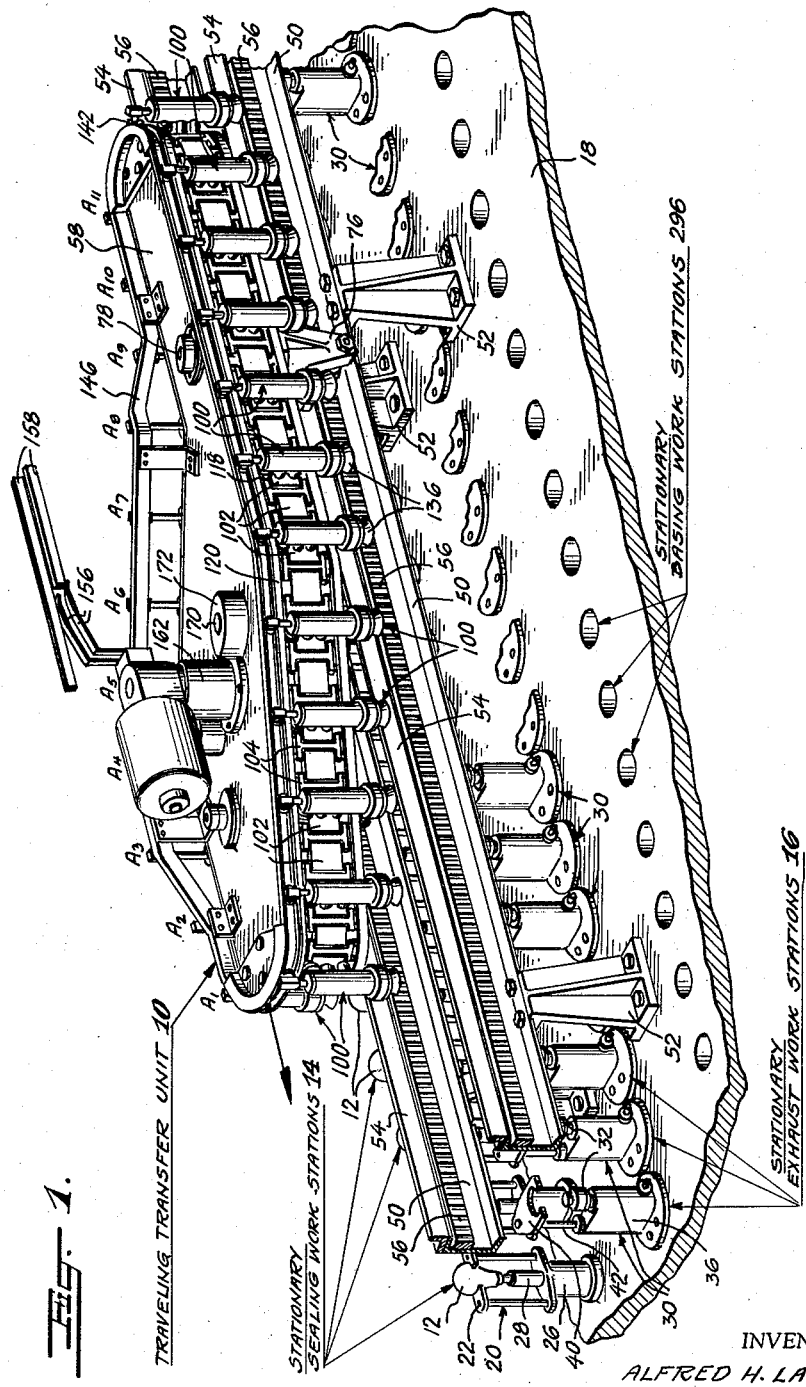

FIG. 6 is a diagrammatic operational view of the path of movement "a" of the article, such as a sealed lamp; of the effective path of movement "b" of the operating plunger of a transfer head; of the effective path of movement "c" of a bulb holder of the sealing head; and the effective path of movement "d" of the bulb holder of the exhaust head, as the article is transferred from the stationary sealing line to the stationary exhaust line by the transfer head.

FIG. 7 is a diagrammatic plan view of an automatic high speed manufacturing machine employing the transfer units between the stationary lines of work positions.

FIG. 8 is a diagrammatic plan view of the transfer conveyor of the transfer unit and showing the loading zone, intermediate zone and unloading zone of the transfer operation and also the transfer of articles substantially transverse to the path of movement of the transfer unit.

FIG. 9 is a vertical sectional view, similar to FIG. 5, of an alternative embodiment of the transfer unit employed for inverting while transferring sub-assemblies, such as mounts, from a transfer conveyor of a stationary mounting line to the sealing line, omitting for the sake of clarity the inner frame portions and drive mechanism of the transfer unit and showing the transfer head in vertical section through an adjacent plate of the transfer conveyor.

FIG. 10 is a side elevational view of the transfer unit of FIG. 9 and showing the means for the inverting of the article, such as a lamp mount, during transfer of the lamp mount by the transfer head.

FIG. 11 is a horizontal sectional view of a mount transfer head along the line XI—XI of FIG. 10 in the direction of the arrows.

FIG. 12 is a vertical sectional view, similar to FIGS. 5 and 9 of a transfer unit for transferring other sub-assemblies, such as lamp bulbs, from a stationary line of bulb feeding devices to the sealing line.

FIG. 13 is a horizontal sectional view of two pairs of lamp transfer heads and associated bulb feeding devices in the loading zone of the transfer conveyor along the line XIII—XIII of FIG. 12 in the direction of the arrows and showing the transfer head in the open and closed positions.

FIG. 14 is a diagrammatic perspective view of the drive mechanism for the transfer unit and the transfer conveyor thereof.

FIG. 15 is a side elevational view of the finished incandescent lamp fabricated on the high speed automatic machine shown in FIG. 7.

FIG. 16 is a side elevational view of a lamp mount.

FIG. 17 is a diagrammatic plan view showing the angular relationship between the angle X formed by the transverse path of movement of the transferred articles and the longitudinal axis of the unloading and loading zones of the transfer conveyor; the angle of inclination $\alpha$ of the intermediate portion of the transfer conveyor and the longitudinal axis of the loading and unloading zones of the transfer conveyor; and the angle of longitudinal displacement $\beta$ formed by the transverse path of movement of the transferred articles and a center line perpendicular to the longitudinal axis of the loading and unloading zones of the transfer conveyor.

FIG. 18 is a diagrammatic plan view of an alternative embodiment of the transfer unit showing how variations of the angle of inclination $\alpha$ of the intermediate portion of the transfer conveyor provide varying transfer speeds and accelerations.

FIG. 19 is a fragmentary diagrammatic plan view of the intermediate portion of the transfer conveyor showing examples of various angles of inclination $\alpha$ of the intermediate portion of the transfer conveyor and the resulting length of the transverse path of movement of the transferred articles.

FIG. 20 is a graph showing the relationship between the angle of inclination $\alpha$ of the intermediate portion of the transfer conveyor, the angle of longitudinal displacement $\beta$ of the transverse path of movement of the transferred articles and the length of the transfer path of movement of said articles.

Although the principles of the invention are broadly applicable to the manufacture of any product which is produced by the assembly of the individual parts, the invention is here specifically employed in conjunction with the manufacture of incandescent lamps and hence it has so been illustrated and will so be described.

With specific reference to the form of the invention illustrated in the drawing, a transfer unit 10 (FIGS. 1–8) is employed to transfer articles, such as sealed lamps 12, from an article feeding line, such as a stationary sealing line 14, to an article receiving line, such as stationary exhaust line 16, as said unit 10 moves therebetween from right to left, as viewed in FIG. 1.

*Sealing Line*

A table 18 (FIGS. 1–8) supported by a plurality of legs (not shown) upstanding from the floor provides the mounting means for the sealing line 14. As shown in FIG. 7 the tandem type sealing line 14 may comprise two longitudinal lines of ninety-six sealing heads 20, arranged in suitable parallel relationship and connected by rounded non-utilized end portions. Each of the heads 20 (FIG. 5) is spaced apart a distance "d" (FIG. 8) which spacing may be six inches. Further each of the sealing heads 20 has a conventional sealing-head bulb holder 22 mounted on a hollow sleeve 24 which is vertically reciprocable and rotatable in a top bearing 26 secured in the table 18 and a bottom bearing (not shown). The sleeve 24 may be reciprocated by conventional means, such as a servo motor or a cam 27 (FIG. 6), which may be mounted on a shaft 27a driven by gears 27b, 27c. A mount pin spindle 28 is rotatable with the sleeve 24 by the same rotating means which rotates the sealing-head bulb holders 22.

Since the individual automatic tooling for sealing the mounts 12m to the bulbs 12b (FIGS. 15 and 16) does not per se form a part of this invention, it is sufficient to say that the bulbs 12b and flares of the mount 12m are preheated, then heated to a semi-plastic condition to effect sealing thereof and finally the seals are molded to a desired contour for the later application of bases 12c in the conventional manner.

*Exhaust Line*

The exhaust line 16 (FIGS. 1–8), similar in shape and construction to the sealing line 14, is located (FIG. 7) adjacent to and within the periphery of the sealing line 14 and is provided with a like number of exhaust heads 30, namely ninety-six, on each longitudinal side. Each of the exhaust heads 30 has a conventional compression rubber assembly 32, such as shown in U.S. Patent No. 2,254,905, issued September 2, 1941, to Daniel Mullan, which assembly 32 is mounted on a pipe 34 secured in a bracket 36 on the top of the table 18 and which pipe 34 extends from a suitable vacuum system (not shown). A conical guide 38 (FIG. 5) positioned on the assembly 32 may be employed to guide a tubulation 12t (FIG. 16) of a lamp 12 into said assembly 32. An exhaust-head bulb holder 40 (FIGS. 5 and 6) is carried by a shaft 42, which is reciprocable in a suitable bushing (not shown) in the bracket 36 by conventional means, such as a servo motor or a cam (not shown) but similarly to the cam 27 which reciprocates the sealing-head bulb holder 22.

Since the individual automatic exhaust tooling for each head 30 does not, per se, form a part of this invention it is sufficient to say that the sealed lamps 12 in the heads 30 are subjected to the conventional exhaust steps comprising baking, alternately flushing and exhausting, final gas fill and tip off, as is customary in the lamp making art.

*Transfer Unit*

The transfer unit 10 for transferring bulbs 12b from one work line to the other is movable along a pair of longitudinal track supporting channels 50 mounted on brackets 52 upstanding from the table 18, each of which brackets 52 are located on the right, as viewed in FIG. 5, of the sealing line 14 and the exhaust line 16 respectively. Each channel 50, having the same contour as the stationary lines 14 and 16 with their curved ends, supports a guide track 54, suitably an angle, on its upper horizontal flange, as viewed in FIG. 5, which track 54 supports and guides the transfer unit 10. A rack 56 is mounted on the vertical portion of the channel 50 (FIG. 5) beneath the upper horizontal flange which is engageable by a suitable drive means, as hereinafter described, to cause movement of the transfer unit 10.

The frame or carriage of the transfer unit 10 (FIGS. 1–5) consists of a top table 58 and a bottom table 60 suitably integrated by a plurality of spaced side supports 62 (FIG. 5) of generally I-shaped vertical cross section, and a pair of generally round end supports 64 (FIG. 4). A forward caster 66, as viewed in FIG. 4, is pivotable on a drive shaft 68 journalled in a top bearing 70 (FIG. 5) on the top table 58 and a bottom bearing 72 on the bottom table 60, which caster 66 is retained thereon by a drive gear 74 in engagement with the rack 56 and similarly a rear caster 76 is pinned to a stud shaft 78 rotatable in a bearing 80 secured between the top table 58 and the bottom table 60, as by bolts. Each of the casters 66, 76 carries a pair of vertical guide rollers 82 (FIG. 5) which ride and thus align the transfer unit with the work-line of articles while a pair of opposed horizontal rollers 84 engage the sides of the track 54 and prevent lateral movement of the transfer unit 10 during its movement on the rollers 82 between the stationary sealing line 14 and the stationary exhaust line 16. As viewed in FIG. 5, the right hand or rear caster 76 has a depending portion 86 in which a roller shaft 90 is secured by means of a screw 88. This shaft 90 carries a retaining roller 92 which rides on the underside of the adjacent rack 56 and prevents the transfer unit 10 from leaving the track 54 while negotiating the curved end portions of the sealing and exhaust lines 14, 16.

As shown in FIGS. 2 and 3, the transfer conveyor of the transfer unit 10 comprises a plurality of transfer heads 100, suitably twenty-three, which pick up articles, such as sealed lamps 12, from the sealing heads 20 on the sealing line 14 and transfer these lamps 10 to the exhaust heads 30 on the exhaust line 16 during movement of the carriage and the transfer conveyor about the periphery of the transfer unit 10.

Transfer Conveyor

Each of the transfer heads 100 (FIGS. 1, 10 and 11) comprises a plate 102 pivoted at each end on link pins 103, which pins are carried by I-shaped links 104 (FIGS. 1 and 10). Article pick-up means 108 (FIG. 5) of the vacuum cup type is secured to alternate plate 102, by means of an upper bolt 110 and a lower bolt 112.

The upper bolt 110 carries a support roller 114 on its inner end, as viewed in FIG. 5, which roller 114 rides on a support track 116 located on the periphery of the transfer unit 10 and supported in suitable grooves in the outer side, as viewed in FIGS. 4 and 5, of the side supports 62 and, of course, the end supports 64. A top support roller 118 on a suitable roller shaft projecting from the upper portion of the pick-up means as viewed in FIG. 5, 108 rides on the bottom surface of a support track 120 affixed to the outer periphery of the top table 58.

Each I-shaped link 104 carries a pair of suitably spaced upper guide rollers 122 (FIG. 5) projecting above the flanged portion of the link 104 and engaging an inverted U-shaped guide track 124 depending from the bottom surface of the top table 58. The track 124 is also supported by the outer surface, as viewed in FIG. 5, of the top flange of the side supports 62 and the end support 64. In like manner the lower flange of each link 104 carries a similar pair of lower guide rollers 126 engageable in a similar guide track 128 supported on the top surface of the bottom table 60 and the bottom flange of the side supports 62 and the end supports 64.

Referring now more particularly to FIG. 5, it will be noted that each transfer head 100 has its pick-up means 108, which comprises a hollow cylindrical body 130 (FIG. 5), provided with a suitable sleeve or bushing 132, a washer-like upper end cap 134 and a resilient pick-up cap 136 for hermetically engaging a bulb 12b of a sealed lamp 12. This cup 136 is secured around the lower projecting end of the sleeve 132 and in the recessed lower end of the body 130, by means of a ring 138. A plunger 140 provided with a lower operating portion of larger diameter than its shank portions, which operating portion is desirably reciprocable in air tight engagement with the sleeve 132, projects through the cap 134 and carries on its upper end a lifting roller 142. The roller 142 rides on a plunger elevating cam track 144 secured by means of a bracket 146 to the top table 58, adjacent the periphery thereof.

As shown in FIGS. 1, 2, 3, 4, 6 and 8 the transfer unit heads 100 during their movement assume a plurality of loading, transferring and unloading positions $A_1$ to $A_{11}$ with the cam track 144 being provided with an inclined elevating portion between loading positions $A_2$ and $A_3$ which raises each continuously moving transfer head 100 (which is relatively stationary with respect to a sealing head), while adjacent the loading portion of the transfer conveyor of the transfer unit 10 and (FIG. 6) the track 144 is provided with a declining lowering portion adjacent the unloading positions $A_9$ to $A_{11}$ (FIGS. 6 and 8) for use as now explained. When the lifting roller 142 (FIG. 5) engages the elevating portion of the cam track 144 the plunger 140 is moved upwardly, in the sleeve 132 along the effective path of movement "b" shown in FIG. 6, thus creating a high vacuum so that the pick-up cup 136 firmly engages the sealed lamp 12 held in the sealing head 20 therebeneath. When the lifting roller 142 rides down the lowering portion of the cam track 144 the plunger 140 is moved downwardly, as viewed in FIG. 6, in the sleeve 132 a distance sufficient not only to break the vacuum between the pick-up cup 136 and the lamp 12, but also to release the lamp 12 from the cup 136 so that it is seated in the compression rubber assembly 32 of an exhaust head 30 therebeneath.

Drive Mechanism for Transfer Conveyor

The twenty-three transfer heads 100 of the transfer conveyor are moved about the periphery of the carriage of the transfer unit 10 by a drive mechanism 150 (FIG. 14) at the same longitudinal speed at which the transfer unit 10 is moved longitudinally between the sealing line 14 and the exhaust line 16 by a drive mechanism 152 (FIG. 14).

The prime mover for the drive mechanism 150 (FIGS. 1, 2, 3, 4, 5 and 14) for simultaneously driving both sides of the transfer conveyor is a motor 154 mounted on the top table 58 and connected by means of the slide contacts 156 (FIGS. 1 and 2) to a pair of overhead bus bars 158, which are connected to a suitable voltage supply (not shown). This motor 154 drives a vertical shaft 160 (FIG. 14) journalled in suitable bearings 162.

By reference now more specifically to FIGS. 4 and 14, it will be noted that the vertical shaft 160 carries a pinion gear 166 which meshes with another pinion gear 168 on a sprocket shaft 170 suitably journalled in bearings 172. As shown particularly in FIGS. 3, 4 and 14, the shaft 170 carries an upper drive member 176 and a lower drive member 178, both of which latter drive members may be sprockets suitably provided with spaced roller engaging means for driving respectively the upper guide rollers 122 and the lower guide rollers 126 on the links 104 of the transfer heads 100. As shown in FIG. 14, the drive gear 166 also engages a gear 182 on a second sprocket shaft 184, suitably journalled in bearings 186, which shaft 184 like the shaft 170 carries an upper drive member 190 and a lower drive member 192, similarly provided with roller engaging means for driving the upper guide rollers 122 and lower guide rollers 126 on the links 104.

Assuming the motor 154 continuously rotates the drive gear 166 in a counterclockwise direction, as viewed in FIG. 14, the pinion gear 168 and the drive members 176 and 178 will rotate in a clockwise direction, thus driving the near side of the transfer conveyor, as viewed in FIGS. 1, 3, 14 to the left. Similarly, the pinion gear 182 and the drive members 190 and 192 will also be rotated in a clockwise direction, thus simultaneously driving the opposite side of the transfer conveyor to the right, as viewed in FIGS. 1 and 3.

Drive Mechanism for Transfer Unit

The drive mechanism 152 (FIG. 14) for the transfer unit 10 is motivated by the gear 166 on the motor shaft 160, which pinion gear 166 engages another pinion gear 192 on the shaft 194 journalled in suitable bearings 196 with the shaft 194 also carrying a smaller pinion gear 200 which drives a gear 202 on a stud shaft 204 journalled in suitable bearings 206. Such stud shaft 204 also carries a pinion gear 210 which drives another pinion gear 212 on the aforementioned drive shaft 68 which latter, it will be remembered, has the drive gear 74 on its lower portion below the front caster 66 and engaging the stationary rack 56.

Thus, it will be seen that the above mentioned counterclockwise rotation, as viewed in FIG. 14, of the gear 166 drives the gears 192 and 200 in a clockwise direction which causes the counterclockwise rotation of the gears 202 and 210 and the clockwise rotation of the gear 212 and the drive gear 74 on the rack 56 with the result that the transfer unit 10 is moved to the left, as viewed in FIGS. 1, 3 and 14.

It will be understood from a consideration of FIGS. 1, 8 and 14 that the drive mechanism 150 for the transfer conveyor moves the longitudinal loading and unloading portions of said conveyor at the same speed as the drive mechanism 152 moves the transfer unit 10 between the stationary sealing line 14 and stationary exhaust line 16, but in the opposite direction, namely to the right.

Thus, it will be seen from a consideration of FIG. 8 that the transfer heads 100 at positions $A_1$ to $A_4$ of the loading portion of the transfer conveyor are moving at the same speed to the right, as the transfer unit 10 is moving to the left, and hence transfer heads 100 in positions $A_1$ to $A_4$ are relatively stationary with respect to the four aligned sealing heads 20 of the stationary sealing line 14 therebeneath. For the same reason, as will be seen in FIG. 8, the transfer heads 100 at positions $A_8$ to $A_{11}$, which are the unloading positions of the transfer conveyor, are relatively stationary with respect to the four exhaust heads 30 of the stationary exhaust line 16 aligned therebeneath. These relatively stationary positions of a transfer head 100 permit the removal of the sealed lamps 12 from the sealing heads 20 to the transfer heads 100 and the transfer of the lamps 12 from the other previously loaded transfer heads 100 to the exhaust heads 30.

Intermediate Portion of the Transfer Conveyor

As shown in FIGS. 3, 6 and 8, the intermediate portion of the transfer conveyor extends from the loading positions to the unloading positions which thus includes the positions $A_5$, $A_6$ and $A_7$ with this intermediate portion thus encompassing a total of four transfer head lengths of $4 \times d$ or $4 \times 6$ in. $=24$ in., also indicated as distance "D" in FIGS. 17 through 20. As shown in these latter figures, the angle of inclination $\alpha$ formed by the inclined intermediate portion of the transfer conveyor and the loading and unloading portions of the transfer conveyor is equal to $180° - 2X°$, where $X°$ is the angle formed by the transverse path of movement of the lamps 12 and said loading and unloading portions of the transfer conveyor. In turn, the angle of longitudinal displacement $\beta$ formed by the transverse path of movement of the lamps 12 and a center line perpendicular to the loading and unloading portions of the transfer unit is equal to $90° - X°$. Thus, the angle of inclination $\alpha$ is always equal to twice the longitudinal displacement $\beta$.

As shown in the alternative embodiment of the transfer conveyor of FIG. 18, the upper guide rollers 122 and the guide track 124 for the transfer heads 100, as well as the lower guide rollers 126 and lower guide track 128, may be replaced by an upper and lower movable member 211a, handily a chain, and guide members 211b, 211c, 211d, suitably sprockets.

Since the transfer unit 10 must travel a distance "D," or 4 head lengths in the example chosen (FIGS. 17–20), from right to left, as viewed in FIG. 8, and the transfer head 100 must travel along the intermediate portion of the transfer conveyor, also 4 head lengths, in the same length of time as the transverse path of movement of the lamps 12 from the sealing line 14 to the exhaust line 16 must be accomplished, the ratio of the length of transverse path of movement of the lamps 12 to the distance "D" is also the ratio of the speed of the transfer of the lamps 12 to the speed of transfer unit 10. Hence, by selecting the angle of inclination $\alpha$ to be such that the transverse path of the movement of the lamps 12 is ⅓ "D", then the velocity of the lamps 12 during transfer will be ⅓ the speed of the transfer unit 10. In FIGS. 18 and 19 examples of transfer speeds of the lamps 12, which are ⅛, ¼, ⅓, ½, and ¾ of the speed of the transfer unit 10 and which are the same as the speed of the transfer unit, are shown.

It can be seen from FIG. 18, that the distance between the operating lines 14 and 16 can be changed to suit changing requirements and the width of the entire machine, FIG. 7, can be readily reduced to a minimum by adjustably mounting the bearings for the sprockets 211c and 211d on the upper plate 58 and lower plate 60 as indicated in FIG. 18. Reduction of the distance between the operating lines 14, 16 likewise reduces the velocity of the lamps 12 during transfer according to the relationship, explained above.

Operation of Transfer Unit

As shown in FIG. 6, positions $B_1$ to $B_6$ are successive effective positions of the lamp 12 and the moving parts of the stationary sealing head 20, during the transfer of the lamp 12 from the sealing head 20 to the transfer head 100. A lamp 12 and a bulb holder 22 of a sealing head on the sealing line 14 are progressively raised by the reciprocating mechanism 27, 27a, to 27c, during movement of the transfer unit 10 so that the lamp 12 and bulb holder 22 effectively travel a resultant path with respect to the latter corresponding to the paths "a" and "c", respectively, from the normal work position $B_1$ to the position $B_2$. When the lamps 12 are in the positions $B_2$ and $B_3$ a wire wiper 214 is reciprocated upwardly along the tubulation 12t to bend the lead wires 12L, depending below the seal of the lamp 12, upwardly in an arcuate form. This bending of the lead wires 12L clears the tubulation 12t for the exhaust and tip-off operation on the exhaust line 16 and prevents the burning off of said lead wires 12L during said tip-off operation. While the lamp 12 is in this preliminary elevated position B2, B3 of FIG. 6, a transfer head 100 moving around the curved forward end, as viewed in FIG. 8, of the transfer conveyor and along the path of a cycloid, aligns itself in position $A_1$ with the lamp 12 in the position $B_3$. The reciprocating mechanism for the bulb holder 22 then further elevates the lamp 12 to position $B_4$ and into an hermetic contact with the axially aligned pick-up cup 136 of the transfer head 100 in the position $A_2$.

Between positions $A_2$ and $A_3$ (FIG. 6) of the transfer head 100, the plunger lifting rollers 142 on the transfer head 100 engage the elevating portion of the cam track 144, thus raising the plunger 140 during movement of the transfer unit 10 which effectively results in the plunger travelling along the path "b" and securing, by means of vacuum, the lamp 12 in position $B_5$ in the suction cup 136 of the transfer head 100, which head 100 is in position $A_3$. While the plunger 140 remains in this upper position and the transfer head is in position $A_4$, the reciprocating mechanism for the bulb holder 22 lowers it to the position $B_6$ thus clearing the lamp 12 and permitting the transfer head 100 and lamp 12 to move along the intermediate portion of the transfer conveyor through the successive positions $A_5$, $A_6$ and $A_7$.

As further shown in FIG. 6 positions $C_1$ to $C_6$ are successive positions of the bulb holder 40 during the transfer of the lamp 12 from the transfer head 100 to the exhaust head 30. As the transfer head 100 moves along the carriage from the position $A_7$ to the position $A_8$ the bulb holder 40 of an adjacent stationary exhaust head 30 is moved upwardly by the reciprocating mechanism for the bulb holder 40 so that the resulting relative movement between the transfer unit 10 and the bulb holder 40 causes the latter to virtually travel a path of movement "d" from its normal work position $C_1$ to the position $C_2$, adjacent the seal of the lamp 12. With the bulb holder 40 in position $C_2$ and the lamp 12 and the transfer head 100 in position $A_8$, the tubulation 12t of the lamp 12 is in vertical alignment with the compression rubber assembly 32 of the exhaust head 30. The reciprocating mechanism for the bulb holder 40 then raises the bulb holder 40 to the position $C_3$ where the latter is just short of engagement with the lamp 12 in the transfer head 100 in the position A$_9$.

Between positions A$_9$ and A$_{10}$ (FIG. 6) of the transfer head 100 the lifting roller 142 (FIG. 5) engages the declining or lowering portion of the cam track 144, thus moving the plunger 140 downwardly in the body 130 of the transfer head 100 a sufficient distance to break the vacuum within the transfer head 100 and to also disengage the bulb 12b from the cup 136 and push the lamp 12 into the bulb holder 40 at position C$_4$. This disengaging movement of the plunger 140 is accomplished when the lifting roller 140 rides down a slight dip in the cam 144 adjacent position A$_{10}$. The plunger 140 of the transfer head 100 is then returned by the cam track 144 to its normal bulb engaging "down" position, shown in position A$_{11}$ after which the reciprocating mechanism for the bulb holder 40 finally lowers the bulb holder 40, so that the tubulation 12t of the lamp 12 is fully inserted into the compression rubber assembly 32 as shown at position C$_6$. The empty transfer head 100 then continues around the rear portion, as viewed in FIG. 8, of the transfer unit 10 on its return trip toward the position A$_1$ where the above transfer cycle is repeated.

It will be noted from a consideration of FIG. 8 that the transfer of a sealed lamp 12 from a sealing head 20 to an exhaust head 30 has been accomplished substantially transverse from the position 1a of the sealing line 14 to the position 1b on the exhaust line 16. The longitudinal displacement of the direction of the movement of the transfer unit 10 is, in the example of FIG. 8, about ⅓ the distance between the adjacent sealing heads 20 and exhaust heads 30. Further, during the transfer of the sealed lamp 12 along the intermediate portion of the transfer conveyor, from position A$_4$ to position A$_8$ of the transfer head 100, the acceleration of the lamp 12 from zero speed at position A$_4$ to ⅓ the carriage speed at position A$_6$ and back to zero speed at position A$_8$, is relatively low, thus providing a smooth transfer of the fragile lamp 12.

*Transfer Unit for Mounts*

As shown in FIG. 7 a transfer unit 10m, an alternative embodiment of the transfer unit 10 (FIGS. 9, 10 and 11), may be employed to transfer stems 12s (FIG. 16) fabricated on a stationary line 216a of stem making heads 218a to a stationary line 216b of heads 218b for support wire inserting and filament mounting. A second transfer unit 10m' may be employed to transfer the mounts 12m from the stationary line 216b to the sealing line 14 and to invert the mounts 12m during transfer. These stem fabricating heads 218a and mounting heads 218b are ninety-six in number and have the same spacing of "d" or 6 inches apart, as the sealing heads 20 and the exhaust heads 30.

Each of the heads 218a and 218b is provided with a pair of tubulation gripping jaws 220 (FIG. 9) for holding the tubulation 12t of a lamp stem 12s during fabrication of the lamp mount 12m for transfer by the transfer unit 10m'.

Since the individual automatic tooling for fabricating the mounts 12m (FIGS. 15 and 16) with their stems 12s does not, per se, form a part of the present invention it is sufficient to say that a flare 12f, tubulation 12t, and lead wires 12L are preheated on each head 218a of the line 216a, then heated to a semi-plastic condition for molding into a stem 12s. After the transfer of the stems 12s by the transfer unit 10m from the line 216a to the line 216b, a button is formed on the end of the arbor 12a (FIG. 16), support wires 12w are inserted into the formed button and curled about the filament mounting portions of the lead wires 12L, and finally a filament 12f is mounted in hooks on the lead wires 12L in the conventional manner to complete fabrication of the mount 12m shown in FIG. 16.

The transfer unit 10m and 10m' are essentially the same as the hereinbefore described transfer unit 10 except for the details of the transfer heads 100m (FIGS. 9, 10 and 11). Each of these heads 100m has a flanged body 222 (FIG. 11) rotatable in an annular bearing 224 provided in the plate 102 (FIG. 11) of the transfer conveyor, which body 222 has its inner shank portion, as viewed in FIGS. 9 and 10, extending beyond the plate 102. As shown in these latter figures, an annular flange 226 of the body 222 rests against the outer portion, as viewed in FIG. 11, of the bearing 224 and carries a plurality of, for example four, hardened metal cam pins 228. The pins 228 are suitably quadrentally located about the periphery of the flange 226. This flange 226 is also provided with two horizontal projections or bifurcations 229 for mounting a pair of operating jaws 238 thereon, as related later. The inner shank portion, as viewed in FIG. 11, of the body 222 is in threadable engagement with a pair of lock nuts 230 which secure the body 222 in rotatable engagement with the bearing 224 in the plate 102. To provide guide and support means for each of the transfer heads 100m a roller 232 is carried on the shank portion of the body 222 adjacent the nuts 230, by means of a snap ring 234. This roller 232 rides in a cam guide track 236 (FIGS. 9 and 11) mounted in the outer side portions, as viewed in FIG. 9, of the side supports 62 and end supports 64 of the carriage of the transfer unit 10m'. It will be understood that the cam guide track 236 extends around the periphery of the transfer unit 10m' and is employed for supporting the transfer heads 100m and for opening the jaws 238 of the transfer heads 100m, as hereinafter related.

For the purpose of transmitting the jaw operating action of the cam guide track 236 to the jaws 238, a round shouldered operating plunger 240 extends through a hole 245 in the body 222 of each of the transfer heads 100m and has an inner annular shoulder 242 (FIG. 11) normally biased by means of a spring 244 bearing against the inner surface of the annular shoulder 242 and the inner surface of the body 222 to thus normally maintain the plunger 240 in its outward position. The outer reduced diameter (FIGS. 9 and 11) of the plunger 240 extends through a suitable bearing in the flange 226 of the body 222 and terminates in a flattened lug-like portion having mounted therein a jaw operating pin 250 which reciprocates in longitudinal operating slots 251 provided in the bifurcations 229 of the flange 226.

Each of the jaws 238 comprise substantially a lever pivotable on pins 252 upstanding from the bifurcations 229 of the horizontal flange 226 and is provided with tubulation receiving notches or grooves on their operating ends and have their respective bifurcated inner ends, as viewed in FIG. 11, in engagement with the pivot pin 250.

It will be understood from a consideration of FIGS. 8, 9, 10 and 11 that the cam guide track 236 is provided with an inclined raised portion between positions A$_{10}$' and A$_{11}$', similar to A$_{10}$ and A$_{11}$ of FIG. 8, which raised portion may continue around the periphery of the transfer unit 10m' to a position A$_1$', similar to position A$_1$ of FIG. 8. Thus, when the operating plunger 240 of a transfer head 100m engages this raised portion of the track 236, said plunger 240 is moved outwardly with respect to the body 22, as viewed in FIG. 11, causing the jaws 238 to rotate about their pivot pins 252 and move their respective ends outwardly from a tubulation 12t, thus disengaging the tubulation 12t and hence releasing the mount 12m of which the tubulation is a part into the mount pin spindle 28 (FIG. 9) of a sealing head 20 aligned therebeneath. In like manner between positions A$_1$' and A$_2$', similar to A$_1$ and A$_2$ of FIG. 8, the operating plunger 240 rides down an inclined portion of the cam guide track 236, and the plunger 240 urged by the spring 244 moves inwardly with respect to the body 222 (FIG. 11) thus again closing the jaws 238 about another tubulation 12t of a mount 12m held in the jaws 220 of a mounting head 218b aligned with the transfer head 100m thereabove.

Mount Inverting Means

As will be noted from a consideration of FIG. 9 that the mounts 12m are initially presented by the mounting heads 218b of the stationary mounting line 216b to the transfer heads 100m in the tubulation "up" position. Since it is imperative that the mount 12m be presented to the mount pin spindle 28 of a sealing head 20 at position A10' (FIG. 9) in the tubulation "down" position, inverting means, such as stationary cams 254, may be secured to the top table 58 by any suitable means, such as a bracket 256, adjacent positions A5' and A7' (FIG. 10) of the transfer unit 10m'. As the transfer conveyor unit 10m' moves from right to left, as shown by the arrow in FIG. 10, the leading cam pin 228 on the flange 226 of the transfer head 100m engages the forward portion of the stationary cam 254 at station A5' causing the head 100m to rotate in a clockwise direction (FIG. 10). As this rotation progresses the leading cam pin 228 rides along a raised portion 258 of the stationary cam 254 and the second cam pin 228 rides against a depressed stop portion 260 of the cam 254, thus limiting the amount of clockwise rotation, as viewed in FIG. 10, of the head 100m and the mount 12m to 90°. Further movement of the transfer conveyor of the transfer unit 10m' brings the second cam pin 228 into engagement with the leading edge of another cam 254 at position A7' (FIG. 10) where a similar 90° rotation in a clockwise direction is achieved thus presenting the now inverted mount 12m to a mount pin spindle 28 of a sealing head 20 in the tubulation "down" position A8' of FIG. 10. The inverting means 254 may be preferably carried by the transfer unit 10m' for transferring the mounts 12m from the mount making line 216b to the sealing line 14, thus presenting the inverted mounts 12m to the sealing line 14 in the tubulation "down" position, as shown on the unloading side of FIG. 9.

Operation of the Mount Transfer Unit

As the transfer unit 10m' move longitudinally from left to right, as indicated by the arrow in FIG. 7, between the stationary mounting line 216b and the stationary sealing line 14, a transfer head 100m with the jaws 238 in the open position follows the path of a cycloid around the forward end portions of the transfer conveyor and aligns itself axially with a sealing head 20 in a position similar to $A_1$ shown in FIG. 8. Between positions similar to position $A_1$ and $A_2$ of FIG. 8, the operating plunger 240 of the transfer head 100m engages the jaw closing portion of the cam guide track 236 causing the jaws 238 to close about the tubulation 12t of the mount 12m, which mount 12m is still held by the jaws 220 of the mount head 218b. The jaws 220 of the filament mounting head 218b open at position $A_4'$ of FIG. 10, and the mount 12m, now held only by the jaws 238 of the transfer head 100m, passes through the intermediate zone of its transfer, positions A5', A6' and A7' (FIG. 10) where the inverting means 254 rotates the mount 12m, 180° in a clockwise direction, as viewed in FIG. 10, to the tubulation "down" position required for presentment of the mount 12m to a mount pin spindle 28 of a sealing head 20 aligned wtih the mount 12m in position A8' (FIG. 10).

At a position corresponding to $A_9$ of FIG. 8 the mount pin spindle 28 is reciprocated upwardly a distance "a" from the dotted line position to the solid line position shown in FIG. 9, so as to receive the lower portion of the tubulation 12t of the mount 12m. Between positions similar to $A_{10}$ and $A_{11}$ of FIG. 8 the operating plunger 240 of the transfer head 100m engages the jaw opening portion of the cam guide track 236. The jaws 238 swing outwardly as viewed in FIG. 11, to release the mount 12m and permit it to slide downwardly into the mount pin spindle 28. Whereupon the mount pin spindle 28 is lowered by the mount pin reciprocating mechanism to its initial dotted line position shown in FIG. 9, thus permitting the mount 12m to clear the now open jaws 238 of the transfer head 100m and further deliver the mount 12 to the sealing position of FIGS. 5, 9 and 12.

Bulb Transfer Unit

As shown in FIG. 7, a transfer unit 10b, a further alternative embodiment of the transfer unit 10 (FIGS. 12, 13) may be employed to transfer bulbs 12b from torsion spring biased chute jaws 262 on the delivery end of a stationary line 264 of bulb delivery chutes 266, to the sealing heads 20 on the sealing line 14, which chutes 262 may be ninety-six in number and spaced a distance "d" or 6 inches apart. These gravity type chutes 264 (FIGS. 7 and 12) may be fed bulbs 12b by an article feeding apparatus, such as shown in copending application Serial No. 618,812, filed October 29, 1956, by Charles W. Hawkey.

The transfer unit 10b is similar in structure to the hereinbefore described transfer unit 10 except that the forward caster 66a (FIG. 12) and rear caster 76a are suitably longer than the casters 66, 76 of the transfer unit 10 to provide greater elevation to the transfer heads 100b with respect to the sealing heads 20 on the stationary sealing line 14. In addition, the transfer heads 100b differ in structure from the transfer heads 100 of the transfer unit 10.

For example, as shown in FIGS. 12 and 13, each transfer head 100b has a plate 102a which differs from the plate 102 of the transfer unit 10 by having a pair of horizontal outwardly projecting lugs 268 for the mounting thereon of a pair of bulb engaging jaws 276 with these lugs 268 being provided with longitudinal slots 269. To provide retaining means for a shouldered horizontally operating plunger 280, a cap 270 is threaded into the plate 102a from the inner side thereof, as viewed in FIGS. 12 and 13. The bulb holding jaws 276 are pivoted on pins 278 extending through the lugs 268, and have their yoke shaped inner ends, as viewed in FIG. 13, connected to an operating pin 279, reciprocable in the slots 269 in the lugs 268.

For the purpose of transmitting cam action to the bulb holding jaws 276, the shouldered horizontally operating plunger 280 extends through the cap 270 and a washer 282 secured in a slot in the plate 102a adjacent the lugs 268, and has its outer end, as viewed in FIGS. 12, 13 secured to the operating pin 279 between the lugs 268. To normally bias the jaws 276 in the closed position around a bulb 12b, a spring 286 (FIG. 13) on the plunger 280 is interposed between the washer 282 and the shoulder of the plunger 280. The right hand operating end of the plunger 280, as viewed in FIG. 13 extends through an opening in the cap 270, and is engageable with a raised portion of a cam track 290 similar in shape and purpose to the cam guide track 236 of the transfer unit 10m'. A roller 288 held on the cap 270 by a snap ring is engageable with the upper and lower surfaces, as viewed in FIG. 12, of the cam track 290 for vertically aligning and supporting the heads 100b.

As shown in FIG. 13, between positions $A_2''$ and $A_3''$ of a transfer head 100b the operating plunger 280 leaves a raised portion of the cam track 290 and, urged by the spring 286, is moved outwardly to the right, as viewed in FIG. 13, thus causing the jaws 276 to pivot inwardly about a lamp 12b held in the chute jaws 262 of the adjacent delivery chute 266. The bulb holding jaws 276 remain closed about the lamp 12b during its movement through successive transfer positions similar to positions $A_4$ to $A_9$ of FIG. 8. Between positions similar to $A_{10}$ and $A_{11}$, the operating plunger 280 rides up an inclined portion of the track 290 moving to the right, as viewed in FIG. 12, to open the jaws 276 and permit the bulb 12b to drop into a bulb holder 22 of a sealing head 20 in the "up" or solid line position shown in FIG. 12. The jaws 276 desirably remain open during the travel of the transfer head 100b around the transfer conveyor of the transfer unit 10b from a position similar to position $A_{11}$ to a position similar to $A_2$ of FIG. 8.

Meanwhile the bulb holder 22 and the bulb 12b carried thereby are moved downwardly by the reciprocating mechanism, a distance "c" from the solid line position shown in FIG. 12 to the sealing position shown by the dotted lines thereof and by the dotted lines of FIG. 5 for the sealing operation, as hereinbefore explained.

*High Speed Automatic Machine*

As shown in FIG. 7 the high speed automatic machine for the manufacture of a product produced by the assembly of the individual parts, such as an incandescent lamp 12, may utilize a transfer unit 10m for transferring stems 12s from the stationary line 216a of stem making heads 218a, desirably ninety-six on each side of the longitudinal axis of the machine, to the mounting heads 218b on the stationary mounting line 216b. A second transfer unit 10m' inverts the finished mounts 12m during transfer from the mounting line 216b to the sealing line 14. The transfer unit 10b follows the transfer unit 10m' in its path of movement and transfers the bulbs 12b from the jaws 262 on the delivery ends of the delivery chutes 266 of the stationary line 264 to the sealing heads 20 on the sealing line 14.

As hereinbefore explained the transfer unit 10 transfers the sealed lamps 12 from the sealing heads 20 on the stationary sealing line 14 to the exhaust heads 30 on the stationary exhaust line 16. In like manner a transfer unit 10f provided with the inverting means, such as the stationary cams 254 shown in FIG. 10, simultaneously inverts the exhausted lamps 12, and transfers them to a stationary line 296 of basing heads 298. After basing, a transfer unit 10g transfers the based lamps 12 to a packing line 300 of the stationary packing heads 302 from which the finished lamps 12 are transferred by automatic means (not shown) to a conveyor belt 304 for delivery to a warehouse.

*Operation of the Automatic High Speed Machine*

As hereinbefore mentioned there are ninety-six operating heads in each of the six operating lines 216a, 216b, 14, 16, 296 and 300 of the automatic high speed machine, which heads are spaced a distance "d" (FIG. 8) or 6 inches apart.

Since the subject machine has ninety-six work stations in each line on each side of its center line, a total of one hundred ninety-two work stations are provided for each operating line. For the five operations from mounting to packing the automatic high speed machine requires $4 \times \frac{1}{3}$ or about 1 additional station per line to compensate for the transfer off-set, $$\frac{d''}{3}$$

(FIG. 8), between lines. Adding twelve empty stations, six empty stations at each end of each line, for the alignment of the transfer units with the longitudinal axis of the stationary operating lines, this gives a total of one hundred nine (96+1+12) work stations on each longitudinal operating portion of each line.

Further, if 19,200 completed lamps per hour are required to be produced by the automatic high speed machine, each of the transfer units 10m, 10m', 10b, 10, 10f, and 10g must make $$\frac{19,200}{192}$$

or 100 complete cycles of operation or trips around the periphery of the automatic high speed machine in one hour and complete each work cycle in $$\frac{3600}{100}$$

or 36 secs. Assuming that the 36 secs. for one work cycle for a transfer unit is broken down into 30.5 secs. for negotiating both of the longitudinal operating portions of the stationary lines 216a, 216b, 14, 16, 296, 300 and 5.5 secs. for negotiating both of the curved portions of these lines, it follows that each transfer unit has to traverse 109 stations on each longitudinal operating portion in $$\frac{30.5}{2}$$

or 15.25 secs. and must travel $109 \times 6''$ or 54.5 ft. in 15.25 secs. Thus the speed of the transfer units is $$\frac{54.5}{15.25}$$

or 3.57 ft./sec. Hence, the maximum acceleration of the lamps 12 during their transfer through the intermediate portion of the transfer conveyor is from zero speed to a fraction of the transfer unit speed, shown for example as about ⅓ in FIG. 8, and back to zero speed at the end of the intermediate portion of the transfer conveyor. This maximum acceleration is, in the example chosen, ⅓ of 3.57 ft./sec. or 1.2 ft./sec./sec.

Further, if two transfer units are employed for each transfer operation of the automatic high speed machine, the required speed for the transfer units when so doubled is $$\frac{3.57}{2}$$

or 1.78 ft./sec. and the maximum acceleration will be $$\frac{1.2}{2}$$

or 6/10 ft./sec./sec.

Thus, it will be seen from the foregoing description that the objects of the invention have been achieved by providing transfer units 10m, 10m', 10b, 10, 10f and 10g for transferring the lamps 12 between the stationary operating lines 216a, 216b, 14, 16, 296 and 300 of the automatic high speed machine of FIG. 7, with small acceleration and at a fraction of the transfer unit speed. Moreover, because of their construction the transfer units are readily adapted to provide any desired fraction of the transfer unit speed or any desired spacing between the operating lines by merely changing the angle of inclination formed by the intermediate portion of the transfer conveyor and the loading and unloading portions thereof. In addition, the transfer of the lamps 12 between the stationary operating lines is accomplished substantially transverse to said lines and the longitudinal displacement in the direction of movement of the transfer units during transfer is desirably only a fraction of the distance between work stations, thus keeping the overall dimensions of the automatic high speed machine to a minimum.

Although a specific embodiment of the present invention has been herein shown and described, it is to be understood that other modifications thereof may be made without departing from the scope of the present invention.

I claim:

1. A transfer unit for transferring articles from an article feeding zone to an article receiving zone, said unit comprising, a carriage, power means for causing relative movement between said carriage and said article feeding and article receiving zones, means supported by said carriage and movable with respect thereto and operable to pick up articles from said article feeding zone and move said articles substantially transverse to the path of relative movement between said carriage and said zones and to transfer said articles to said article receiving zone, said carriage-supported means having a first portion thereof relatively stationary with respect to said article feeding zone during a predetermined period of the movement of said carriage-supported means with respect to the movement of said carriage to permit the transfer of said articles from said article feeding zone to said carriage-supported means while the latter is relatively stationary, said carriage-supported means having a second portion thereof relatively stationary with respect to said article receiving zone during a predetermined period of the movement of said carriage-supported means with respect to the movement of said carriage to permit the transfer of said articles from the latter to said article receiving zone while the second portion of said carriage-supported means is relatively stationary, and said carriage-supported means having a portion intermediate said first and second portions of said carriage-supported means and operable to move said articles substantially transverse to the path of relative movement between said carriage and said article feeding and receiving zones at a fraction of the speed of relative movement therebetween.

2. A transfer unit for transferring articles from a stationary article feeding zone to a stationary article receiving zone, said unit comprising, a movable carriage, power means for causing movement of said carriage between said article feeding and receiving zones, means supported by said carriage and movable with respect thereto and operable by the movement of said carriage to pick up articles from said article feeding zone and move them substantially transverse to the path of movement of said carriage, and to then transfer said articles to said article receiving zone, said carriage-supported means having a first portion thereof relatively stationary with respect to said article feeding zone during a predetermined period of the movement of said carriage-supported means with respect to the movement of said carriage to permit the transfer of said articles from said article feeding zone to said carriage-supported means, while the latter is relatively stationary, said carriage-supported means having a second portion thereof relatively stationary with respect to said article receiving zone during a predetermined period of the movement of said carriage-supported means with respect to the movement of said carriage to permit the transfer of said articles from the latter to said article receiving zone while the second portion of said carriage-supported means is relatively stationary, and said carriage-supported means having a portion intermediate said first and second portions of said carriage-supported means and operable to move said articles substantially transverse to the path of movement of said carriage between said article feeding and receiving zones at a fraction of the speed of said carriage, said intermediate portion of said carriage-supported means having an angle of inclination $\alpha$ with respect to said first and second portions of $180° - 2X°$, where X is the angle that the transverse path of movement of said articles makes with the first and second portions, and providing an angle of longitudinal displacement $\beta$ with a centerline transverse to the first and seond portions of $90° - X$.

3. A transfer unit for transferring articles from a stationary article feeding zone to a stationary article receiving zone, said unit comprising, a movable carriage, power means for causing movement of said carriage between said article feeding and receiving zones, means supported by said carriage and movable with respect thereto and operable by the movement of said carriage to pick up articles from said article feeding zone and move them substantially transverse to the path of movement of said carriage, and to then transfer said articles to said article receiving zone, said carriage-supported means having a first portion thereof relatively stationary with respect to said article feeding zone during a predetermined period of the movement of said carriage-supported means with respect to the movement of said carriage to permit the transfer of said articles from said article feeding zone to said carriage-supported means while the latter is relatively stationary, said carriage-supported means having a second portion thereof relatively stationary with respect to said article receiving zone during a predetermined period of the movement of said carriage-supported means with respect to the movement of said carriage to permit the transfer of said articles from the latter to said article receiving zone while the second portion of said carriage-supported means is relatively stationary, said carriage-supported means having a portion intermediate said first and second portions of said carriage-supported means and operable to move said articles substantially transverse to the path of movement of said carriage between said article feeding and receiving zones at a fraction of the speed of said carriage, and means on said carriage adjacent said intermediate portion of said carriage-supported means and operable to rotate said articles a desired amount during the movement of said articles along said intermediate portion.

4. A transfer unit for transferring articles from a stationary article feeding zone to a stationary article receiving zone, said unit comprising, a movable carriage, power means for causing movement of said carriage between said article feeding and receiving zones, means supported by said carriage and movable with respect thereto and operable by the relative movement between said carriage and said zones to pick up articles from said article feeding zone and move them substantially transverse to the path of movement of said carriage, and to then transfer said articles to said article receiving zone, said carriage-supported means comprising guide means on said carriage, a movable member passing around and supported by said guide means, transfer means on said movable member and adapted by the relative movement of said movable member and said carriage to move along the path of a cycloid to align said transfer means with said article feeding zone, said portion of said movable member carrying the transfer means in alignment with said article feeding zone beiing relatively stationary with respect to said article feeding zone during a predetermined period of the movement of said movable member with respect to the movement of said carriage to permit the transfer of said articles from said article feeding zone to said transfer means while the latter is relatively stationary, said movable member having a second portion thereof relatively stationary with respect to said article receiving zone during a predetermined period of the movement of said movable member with respect to the movement of said carriage to permit the transfer of said articles from the latter to said article receiving zone while the second portion of said movable member is relatively stationary, and said movable member having a portion intermediate said first and second portions of said movable member and operable to move said articles substantially transverse to the path of movement of said carriage between said article feeding and receiving zones at a fraction of the speed of said carriage.

5. A transfer unit for transferring articles from a stationary article feeding zone to a stationary article receiving zone, means in said article feeding zone for supporting said articles, means in said article feeding zone and operable to cause the raising and lowering of said articles with respect to said article supporting means; said transfer unit comprising a movable carriage, power means for causing movement of said carriage between said article feeding and receiving zones, means supported by said carriage and movable with respect thereto and operable by the movement of said carriage to pick up articles from said article feeding zone and move them substantially transverse to the path of movement of said carriage, and to then transfer said articles to said article receiving zone, said carriage-supported means having a first portion thereof relatively stationary with respect to said article feeding zone during a predetermined period of the movement of said carriage-supported means with respect to the movement of said carriage to permit the transfer of said articles from said article feeding zone to said carriage-supported means while the latter is relatively stationary and when said articles are raised to an elevated position above said article supporting means by the operation of said raising and lowering means, said carriage-supported means having a second portion thereof relatively stationary with respect to said article receiving zone during a predetermined period of the movement of said carriage supported means with respect to the movement of said carriage to permit the transfer of said articles from the latter to said article receiving zone while the second portion of said carriage-supported means is relatively stationary, and said carriage supported means having a portion intermediate said first and second portions of said carriage-supported means and operable to move said articles substantially transverse to the path of movement of said carriage between said article feeding and receiving zones at a fraction of the speed of said carriage.

6. A transfer unit for transferring articles from a stationary article feeding zone to a stationary article receiving zone, means in said article receiving zone for supporting said articles, means in said article receiving zone and operable to cause the raising and lowering of said articles with respect to said article supporting means; said transfer unit comprising a movable carriage, power means for causing movement of said carriage between said article feeding and receiving zones, means supported by said carriage and movable with respect thereto and operable by the movement of said carriage to pick up articles from said article feeding zone and move them substantially transverse to the path of movement of said carriage, and to then transfer said articles to said article receiving zone, said carriage-supported means having a first portion thereof relatively stationary with respect to said article feeding zone during a predetermined period of the movement of said carriage-supported means with respect to the movement of said carriage to permit the transfer of said articles from said article feeding zone to said carriage-supported means while the latter is relatively stationary, said carriage supported means having a second portion thereof relatively stationary with respect to said article receiving zone during a predetermined period of the movement of said carriage-supported means with respect to the movement of said carriage to permit the transfer of said articles from the latter to said article receiving zone while the second portion of said carriage-supported means is relatively stationary and when said articles are raised to an elevated position above said article supporting means by the operation of said raising and lowering means, and said carriage-supported means having a portion intermediate said first and second portions of said carriage-supported means and operable to move said articles substantially transverse to the path of movement of said carriage between said article feeding and receiving zones at a fraction of the speed of said carriage.

7. A transfer unit for transferring articles from a stationary article feeding zone to a stationary article receiving zone, a first supporting means in said article feeding zone for supporting said articles, a first raising and lowering means in said article feeding zone operable to cause the raising and lowering of said articles with respect to said first article supporting means, a second supporting means in said article receiving zone for supporting said articles, a second raising and lowering means in said article receiving zone and operable to cause the raising and lowering of said articles with respect to said second article supporting means; said transfer unit comprising a movable carriage, power means for causing movement of said carriage between said article feeding and receiving zones, means supported by said carriage and movable with respect thereto and operable by the movement of said carriage to pick up articles from said article feeding zone and move them substantially transverse to the path of movement of said carriage, and to then transfer said articles to said article receiving zone, said carriage-supported means comprising guide means on said carriage, a movable member passing around and supported by said guide means, transfer means on said movable member and adapted by the relative movement of said movable member and said carriage to move along the path of a cycloid to align said transfer means with said article feeding zone, said portion of said movable member carrying the transfer means in alignment with said article feeding zone being relatively stationary with respect to said article feeding zone during a predetermined period of the movement of said movable member with respect to the movement of said carriage to permit the transfer of said articles from said article feeding zone to said transfer means while the latter is relatively stationary and when said articles are raised to an elevated position above said first article supporting means by the operation of said first raising and lowering means, said movable member having a second portion thereof relatively stationary with respect to said article receiving zone during a predetermined period of the movement of said movable member with respect to the movement of said carriage to permit the transfer of said articles from the latter to said article receiving zone while the second portion of said movable member is relatively stationary and when said articles are raised to an elevated position above said second article supporting means by the operation of said second raising and lowering means, and said movable member having a portion intermediate said first and second portions of said movable member and operable to move said articles substantially transverse to the path of movement of said carriage between said article feeding and receiving zones at a fraction of the speed of said carriage, and means on said carriage adjacent said intermediate portion of said movable member and operable to rotate said articles a desired amount during the movement of said articles along said intermediate portion, said intermediate portion of said movable member having an angle of inclination $\alpha$ with respect to said first and second portions of $180° - 2X°$, where X is the angle that the transverse path of movement of said articles makes with the first and second portions, and providing an angle of longitudinal displacement $\beta$ with a centerline transverse to the first and second portions of $\tfrac{1}{2}\alpha°$.

8. A transfer unit for transferring mounts from a stationary mount making zone to a stationary sealing zone, mount making heads in said mount making zone for supporting said mounts, a first cam means in said mount making zone and operable to cause the raising and lowering of said mounts with respect to said mount making heads, sealing heads in said sealing zone for supporting said mounts, a second cam means in said sealing zone and operable to cause the raising and lowering of said mounts with respect to said sealing heads; said transfer unit comprising a movable carriage, power means for causing movement of said carriage between said mount making and sealing zones, means supported by said carriage and movable with respect thereto and operable by the movement of said carriage to pick up mounts from said mount making zone and move them substantially transverse to the path of movement of said carriage, and to then transfer said mounts to said sealing zone, said carriage-supported means comprising guide means on said carriage, a movable member passing around and supported by said guide means, transfer heads on said movable member and adapted by the relative movement of said movable member and said carriage to move along the path of a cycloid to align said transfer heads with said mount making zone, said portion of said movable member carrying the transfer heads in alignment with said mount making zone being relatively stationary with respect to said mount making zone during a predetermined period of the movement of said movable member with respect to the movement of said carriage to permit the transfer of said mounts from said mount making zone to said transfer heads while the latter is relatively stationary and when said mounts are raised to an elevated position above said mount making heads by the operation of said first cam means, said movable member having a second portion thereof relatively stationary with respect to said sealing zone during a predetermined period of the movement of said movable member with respect to the movement of said carriage to permit the transfer of said mounts from the latter to said sealing zone while the second portion of said movable member is relatively stationary and when said mounts are raised to an elevated position above said sealing heads by the operation of said second cam means, and said movable member having a portion intermediate said first and second portions of said movable member and operable to move said mounts substantially transverse to the path of movement of said carriage between said article feeding and receiving zones at a fraction of the speed of said carriage, and means on said carriage adjacent said intermediate portion of said movable member and operable to rotate said mounts a desired amount during the movement of said mounts along said intermediate portion, said intermediate portion of said movable member having an angle of inclination $\alpha$ with respect to said first and second portions of $180° - 2X°$, where X is the angle that the transverse path of movement of said mounts makes with the first and second portions, and providing an angle of longitudinal displacement $\beta$ with a center-line transverse to the first and second portions of $\frac{1}{2}\alpha°$.

9. A transfer unit for transferring articles from a stationary article feeding line to a stationary article receiving line, said unit comprising, a carriage movable at a predetermined rate of speed between said article feeding line and said article receiving line, endless conveyor means carried by said carriage and movable with respect to said carriage, said endless conveyor means moving in a rotary fashion with respect to said article feeding line and said article receiving line, one portion of said endless conveyor means remaining stationary with respect to said article feeding line for a predetermined time as said carriage moves said endless conveyor means, said one portion of said endless conveyor means which is stationary with respect to said article feeding line operable to pick up and carry articles from said article feeding line, simultaneously another portion of said endless conveyor means remaining stationary with respect to said article receiving line for a predetermined time as said carriage moves said endless conveyor means, said other portion of said endless conveyor means which is stationary with respect to said article receiving line operable to deliver articles carried thereby to said article receiving line, an intermediate portion of said endless conveyor moving from said one portion of said endless conveyor means which is stationary with respect to said article feeding line and toward said other portion of said endless conveyor means which is stationary with respect to said article receiving line, and said intermediate portion of said endless conveyor means operable to carry articles from said article feeding line toward said article receiving line at a rate of speed which is less than the predetermined rate of speed at which said carriage moves with respect to said article feeding line and said article receiving line.

10. Apparatus for transferring articles from a stationary article feeding line to a stationary article receiving line, said apparatus comprising: a carriage movable at a predetermined speed along said feeding line and said receiving line; a conveyor means carried by said carriage and movable with respect thereto; at any given time one portion of said conveyor means being stationary with respect to said feeding line and another portion of said conveyor means being stationary with respect to said feeding line, and an intermediate portion of said conveyor means being angularly disposed between and moving from said feeding line and toward said receiving line at a speed which is less than that speed at which said carriage is movable along said feeding line and said receiving line; and article retaining means on said conveyor means and operable to transfer articles from said feeding line to said receiving line at a speed which is always less than the speed at which said carriage moves along said feeding line and said receiving line.

11. Apparatus for transferring articles from a stationary article feeding line to a stationary article receiving line, said apparatus comprising:
(a) a carriage movable at a predetermined speed along said feeding line and said receiving line;
(b) endless conveyor means carried by said carriage and movable on said carriage;
(c) one portion of said conveyor means being stationary with respect to said feeding line as said carriage moves along said feeding line;
(d) another portion of said conveyor means being stationary with respect to said receiving line as said carriage moves along said receiving line;
(e) an intermediate portion of said conveyor means angularly disposed between said feeding line and said receiving line and moving from said feeding line and toward said receiving line at a speed which is less than that speed at which said carriage moves along said feeding line and said receiving line; and
(f) article retaining means carried by said conveyor means, said article retaining means when moved by said conveyor means to position stationary with respect to said feeding line operable to pick up articles from said feeding line and to retain such picked-up articles, and said article retaining means when moved by said conveyor means to position stationary with respect to said receiving line operable to feed retained articles to said receiving line.

References Cited in the file of this patent
UNITED STATES PATENTS

| 2,551,080 | Allen | May 1, 1951 |
| 2,611,493 | Nordquist | Sept. 23, 1952 |
| 2,932,376 | Millington | Apr. 12, 1960 |

FOREIGN PATENTS

| 777,989 | Great Britain | July 3, 1957 |